Sept. 1, 1936.　　　G. F. MAIERS　　　2,052,718
NUT HULLER
Filed March 5, 1935　　　2 Sheets-Sheet 1
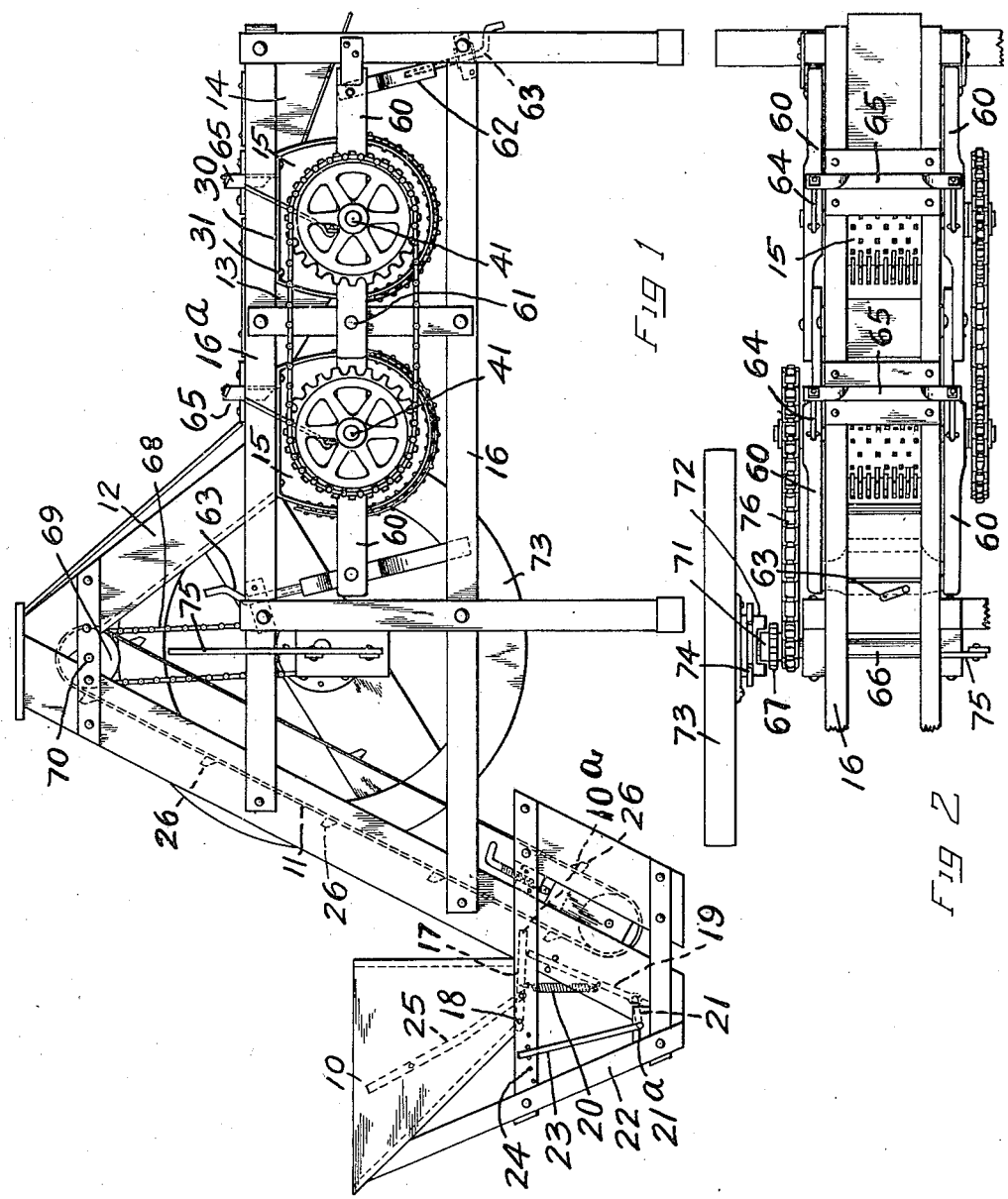
INVENTOR
GEORGE F. MAIERS
ATTORNEYS

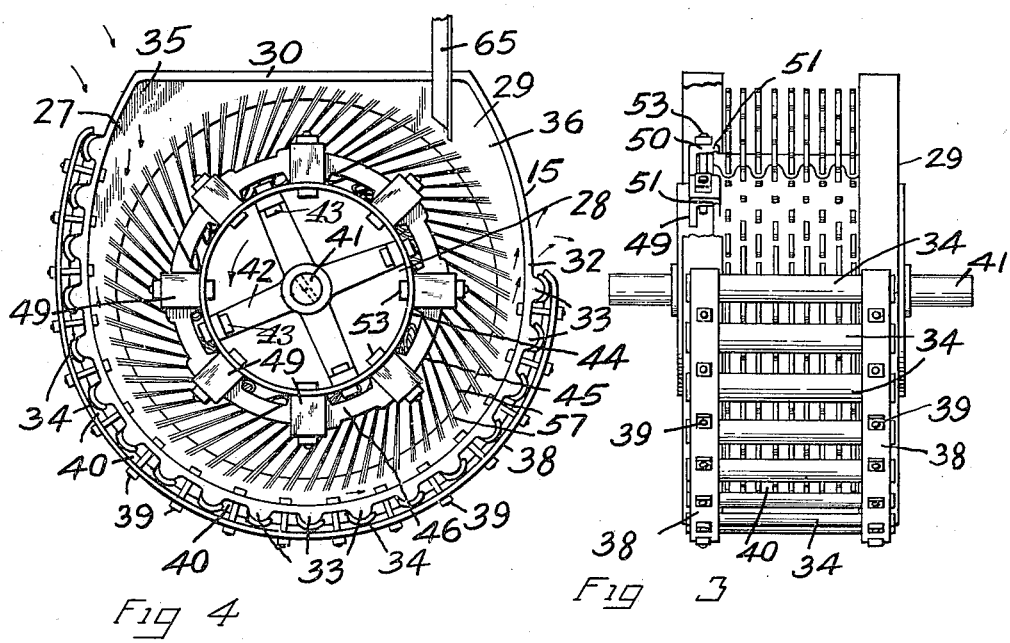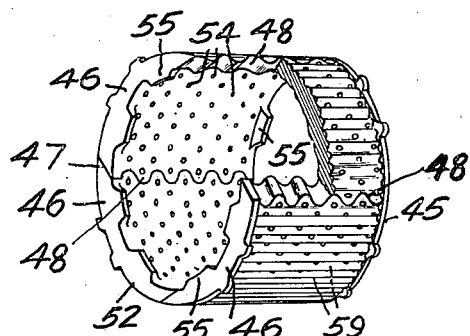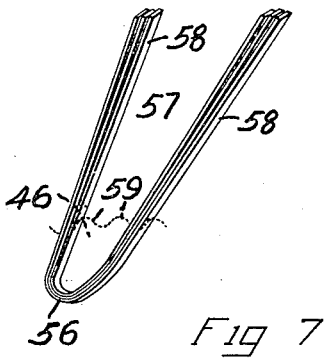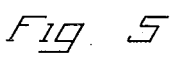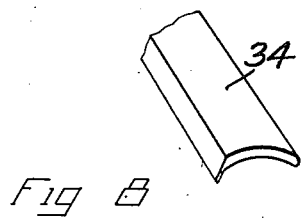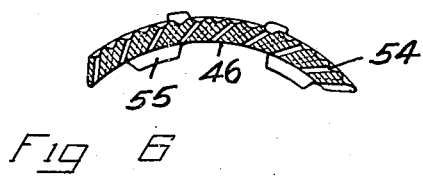

Patented Sept. 1, 1936

2,052,718

UNITED STATES PATENT OFFICE 2,052,718

NUT HULLER

George F. Maiers, Santa Barbara, Calif.

Application March 5, 1935, Serial No. 9,491

8 Claims. (Cl. 146—8)

This invention relates to nut hullers, and has particular reference to machines of the type in which the hulling is effected by a concave and co-acting rotary beater or brush during conveyance of the nuts through the concave, and an object is to provide novel and highly effective means for controlling the pressure of the resilient bristles of the beater or brush against the nuts and hence the extent of impingement of the nuts against the cutting knives of the concave while translating the nuts from the intake side of the concave to the discharge side thereof and for accurately predetermining the depth of cut of the knives.

A further object is to provide means to enable the knives of the concave to be individually adjusted at any place in the concave, whereby to suit varying conditions prevailing in the hulling of the nuts.

Another object is to provide novel fulcrum means for the bristles of the brush, the same acting to prevent objectionable abrupt bending of the bristles which heretofore could not be avoided and which is known to have resulted in crystallization of the bristles incident to high frictional heat created at the points of flexure of the bristles during rotation of the brush, the crystallization and rapid bending of the bristles resulting in premature destruction thereof.

Another object is to provide a huller having a rotary brush consisting of a segmental back in which the segments clearly interfit each other in a manner to eliminate the heretofore existing openings between them, in which openings the nuts could lodge and produce obstructions at the very points of flexure of the bristles, causing fracturing of the bristles with resulting early destruction thereof.

Another object is to provide a huller having a battery of hulling assemblies for the successive handling of the nuts and means for effecting a positive transfer of the nuts from one assembly to the other in operative time with the continuous feeding of the nuts to the machine.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

Referring to the drawings:

Figure 1 is a view in side elevation of the machine;

Figure 2 is a view in top plan of a portion of the machine;

Figure 3 is a view in end elevation of one of the hulling assemblies, with one of the end plates of the concave removed;

Figure 4 is an end view of the hulling assembly, with parts removed for the purpose of a full disclosure of the parts;

Figure 5 is a sectional perspective view of the brush back;

Figure 6 is a transverse section through one of the back segments;

Figure 7 is a perspective view of one of the bristles, showing a portion of the brush back in dotted lines to illustrate the manner of disposing the stretches of the bristles against the fulcrum ribs of the back and illustrating also the manner of threading the stretches through a pair of perforations in the back; and Figure 8 is a perspective view of a portion of one of the cutting knives.

In carrying the invention into practice, use is made of a hopper 10, conveyor 11, chutes 12, 13 and 14 and a plurality of hulling assemblies 15. In the present embodiment of the invention, two hulling assemblies are employed, and same are arranged so that after the nuts have been operated upon by one of said assemblies, they will be transferred into the next one of the plurality employed. However, it is to be clearly understood that more than two of said assemblies can be employed and, in some instances, only one thereof need be used. In other words, an operative machine may consist of one or any suitable number of said assemblies. A machine consisting of the aforementioned instrumentalities also includes a suitable supporting frame 16, at one end of which the hopper 10 is disposed and arranged at an elevation to enable same to be readily supplied with nuts. The chute 14 is located at the opposite end of the frame and is disposed at an elevation to enable the hulled nuts to be discharged either onto a table or into the customary cage of a well known form of washing apparatus as desired.

The hopper 10 is provided with a bottom 17, hinged for vertical movement at 18, and having an end 10a from which the nuts can discharge in a lateral direction onto the conveyor 11. Said end 10a of the hopper bottom is held normally in yielding engagement with the upper extremity of a vertically movable stop arm 19 of a bell crank lever 21 by means of a coil spring 20 and, as illustrated, said lever has pivotal connection at 21a with the frame 22 of said hopper and is provided with a long arm 23, the free end of which is disposed in a position to enable it to be easily reached and manipulated when it is desired to adjust the bottom for operative discharge of nuts onto said conveyor. Said long arm is adapted to coact with an arcuate series of retaining pins 24 on said frame 22, whereby the stop arm 19 can be held in any desired position of vertical adjustment as may be required for operative discharge of the nuts from the hopper, as will be readily understood. As shown in Figure 1 of the drawings, the bottom 17 of the hopper is provided with an agitator 25 which extends into the hopper to insure discharge of the nuts from the hopper during actuation of said bottom.

The conveyor 11 is of the endless belt type and extends upwardly and forwardly at a suitable angle so that nuts deposited onto the elevating elements 26 will discharge into the chute 12. It will be noted that the end 10a of the hopper bottom 17 extends into the path of movement of the elevating elements 26 so that said elements will strike said end and raise it a sufficient distance to enable the elements to pass said end and the end subsequently brought to rest against the stop arm. In this manner means are provided whereby the nuts will be evenly fed to the conveyor automatically during continuous movement of said conveyor.

The hulling assemblies 15 are disposed in horizontal alinement and each thereof consists generally of a concave 27 and a rotary brush or beater 28. Specifically, each concave comprises parallel spaced apart identical end plates 29 having flat upper portions 30 bolted at 31 to the top bars 16a of the frame 16 and annular flanges 32, the latter provided with short length semi-spherical ribs 33. These ribs are equi-distantly spaced apart from each other and the ribs of one plate are disposed in horizontal alinement with the ribs of the opposite plate, as will be appreciated upon reference to Figure 3. A bottom for the concave consists of concavo-convex knives 34, the concave sides of which are in flat contact with the transversely curved surfaces of said ribs at the ends of said knives, and the knives are thereby adapted to be turned concentrically relative to said ribs in order that their beveled cutting edges can be extended into the concave at requisite distances from the brush or beater for operative engagement with the hulls of the nuts as the latter are translated from the intake side 35 of the concave to the discharge side 36 thereof. The convex backs of the knives are engaged by narrow clamping bands 38 which are removably secured to the flanges 32 of said plates 29 by bolts 39. It follows from what has been just stated that the knives can be individually adjusted so that, and as may be necessary to the production of best results, some thereof can extend into the concave a greater distance than others. By spacing the knives from each other as shown and described, intervening passages 40 are formed between the knives for discharge of the broken shells and hull cuttings from the concave during rotation of the brush or beater. The position of the chute 12 with respect to the concave at the left hand side of Figure 1 of the drawings is such that the nuts discharging therefrom will be deposited into the concave at the intake side 35 thereof. The position of the chute 13 is such with respect to both said concaves that nuts which have been acted upon by the assembly at the left side of Figure 1 will be transferred to the concave at the right hand side of said figure in operative time with the feeding of the nuts to said assemblies by the conveyor 11.

The brush or beater for each of the aforementioned concaves comprises a driven shaft 41 on which a spider 42 is fixed. This spider is bolted at 43 to a metal cylinder 44. Mounted on the cylinder to rotate therewith is a cylindrical brush back 45 consisting of segments 46 which are mitered to provide close fitting lap joints 47, and, as illustrated, the confronting faces of said segments are undulated at 48 to interfit each other in a manner to provide a perfectly smooth closed joint between said faces to prevent particles of shells or the whole nuts from entering between said faces where they would offer abrupt surfaces in the flexing paths of the steel bristles of the brush. Clamping elements 49 in the form of angle plates are employed for securing the segments to the cylinder 44, and, as shown in Figure 3, the flanges 50 of said elements are grooved at 51 to receive the flanges 52 of said segments. The elements 49 are removably secured to the cylinder 44 by bolts 53.

The segments 46 of the aforementioned brush back are each provided with a plurality of circumferential rows of equidistantly spaced perforations 54. These perforations are obliquely disposed relative to the axis of the brush, and the said rows of perforations in one segment are in circumferential alinement with the corresponding row of perforations of the conjoined segments, whereby the back is provided with annular and relatively staggered rows of perforations which are axially spaced apart from each other. The segments are formed with inwardly projecting spacing flanges 55 which engage with the cylinder 44 to space the inner surface of the back from the outer surface of said cylinder, whereby the bight portions 56 of the bristles 57 can be operatively received in the space between said inner surface of said back and the outer surface of said cylinder 44. The bristles consist of one or more equal length strips of stiff spring metal, each having outwardly diverging stretches 58. These stretches are threaded through an adjacent circumferential pair of the perforations 54, as will be appreciated upon reference to Figure 7. The external face of the back is formed with parallel ribs 59 which are equi-distantly spaced apart annularly of the back as shown in Figure 5 and disposed with respect to the perforations whereby the stretches 58 will freely fulcrum on said ribs during flexure of the stretches when the brush is rotated and the stretches brought into contact with the nuts.

The brush shafts 41 are journaled in bracket arms 60, the inner ends of which overlap each other and are pivoted at 61 to the frame 16 to enable the brushes to be raised and lowered in their concaves, whereby the pressure of the bristles against the nuts can be controlled as desired. The outer ends of said arms 60 are pivoted to vertically adjustable members 62, each adapted to be actuated by a raising and lowering screw 63 on the frame 16.

The arms 60 are provided with links 64 carrying deflector bars 65 which coact with the respective concaves to timely discharge the nuts from the concaves after the nuts have been conveyed to the discharge sides of said concaves.

A driven shaft 66 is journaled in the frame 16 and fixed thereto is a sprocket gear 67 over which a chain 68 is trained and operatively connected with the sprocket 69 on the driven shaft 70 of the conveyor 11. The sprocket 67 is formed with a clutch element 71 for coaction with a clutch element 72 on the drive wheel 73, the latter being free to turn on the shaft 66 and to move axially so that the element 72 can be engaged with and disengaged from the element 71 to start and stop the machine as and when desired. A clutch fork 74 is operatively connected with the element 72 and with a control lever 75, whereby the elements 71 and 72 can be thrown into and out of engagement for the purpose just stated. Power from the shaft 66 can be transferred to the brush in the concave of the hulling assembly at the left of Figure 1, by means of the chain drive 76 between said brush shaft 41 and the said shaft 66. In like manner, power can be transferred to the brush shaft of the right hand assembly and the shaft 41 of said left hand assembly. It follows that from the form of driving means employed herein the respective mechanisms of the machine can be simultaneously thrown into and out of operation by the single control lever 75.

Having described the essential structural features of the invention, the operation is as follows:

Assuming the respective mechanisms to be in motion, the nuts to be hulled will be collected by the conveyor 11 and conducted to the chute 12, thence to the intake side of the first hulling assembly 15, that is to say, the one which directly communicates with the said chute. Assuming the direction of movement of the brush in said first assembly to be counter-clockwise, and noting now that the effective cutting edges run counter to said direction of movement of the brush, the nuts will enter the space between the bottom of the concave of said assembly and the free extremities of the bristles of the brush and be yieldingly pressed against the cutting edges of said knives, resulting in a progressive planing away of the hulls as the nuts are carried around the concave by the action of the brush there against. The bristles thus function to advance the hulls against said knives with sufficient force to cut the hulls and to translate the nuts from the intake side of the concave to the discharge side thereof. When two hulling assemblies are employed as herein provided for, the nuts will be discharged from one assembly into the other in operative time with the feeding of the nuts to the machine at the hopper side of said machine.

As the hulls of the nuts are cut by the knives, the cuttings will be rapidly evacuated from the concaves by way of the spaces between the knives, the brushes acting to impose sufficient force against said cutting to rapidly clear the spaces between said knives.

By constructing the brushes with segmental backs, as herein shown and described, any one of the segments can be removed for repair purposes and another one quickly substituted therefor. In Figure 7, I show a bristle made up of three strips of spring steel, the strips being nested together, so to speak, or arranged one on the other. I do not wish to be limited to the number of strips forming said bristles and shall expect to depart from the arrangement shown without departing from the spirit of the invention. I also show strips of flat metal so that the free extremities thereof will be parallel to the effective cutting edges of the knives. I find in practice that very satisfactory results can be had from this arrangement of the strips as the force of the strips can be squarely imposed upon the nuts to thereby render highly effective the action of the knives.

A machine constructed as herein disclosed will operate to hull the nuts very rapidly and the hulls will be cut away from the shells in a highly effective manner. The machine is also constructed to enable any desired pressure to be advanced against the nuts as may be necessary to predetermine the depth of cut of the knives and to adapt the machine to the handling of nuts of varying sizes. These last named features are made possible by reason of the independent adjustability of the knives and the means employed for raising and lowering the brushes relative to said knives.

I have stated that the knives herein employed can be individually adjusted to suit varying requirements, that is to say, the varying degrees of thickness of the hulls. Now it will be noted that the concave for most part is substantially concentric to the brush in the ordinary operation of the machine, but that at the left side the walls thereof are slightly eccentric, thus providing more space between the brush and the concave at the effective intake side for easy entrance of the nuts. The knives can be gradually further advanced into the concave as they approach the intake side and in consequence thereof, the frictional resistance offered to the movement of the nuts will be gradually less toward said outlet side. To this extent, the position occupied by the cutting edges will be more or less eccentric relative to the brush and the cutting of the hulls will be less in the direction of the said outlet, thus enabling the nuts to readily discharge from the machine.

While the invention is particularly useful in the hulling of walnuts, it is to be understood that I am not to be limited in this respect.

I claim:

1. In a nut huller, a concave having intake and discharge ends; a rotary brush in said concave; the concave embodying an annular series of transversely curved knives having cutting edges disposed relative to the periphery of the brush to contact and thus cut the hulls of the nuts during rotation of the brush and said brush coacting with the concave to convey the nuts from the intake end to the discharge end of the concave; means for supporting the knives for independent adjustment relative to the path of movement of the nuts during conveyance thereof through the concave, said supporting means comprising a boss for each knife, the same concentrically related thereto to enable the knife to turn thereon while in firm contact therewith; and means for clamping said knives to said bosses.

2. In a nut huller, a concave having hull removing knives; and a brush for conveying nuts through the concave and yieldingly forcing the nuts against the knives and comprising a perforated back having exterior transversely curved ribs disposed parallel to the axis of rotation of the brush, and bristles of heavy strip spring metal provided with stretches threaded through adjacent ones of the perforations from inside the back in such proximity to adjacent ones of the ribs to contact therewith and fulcrum thereon during flexure of the stretches.

3. In a nut huller, a concave having hull removing knives; and a rotary brush in said concave for translating nuts therethrough and comprising a cylindrical segmental back in which the confronting ends of adjacent segments are formed with undulatory interfitting faces; a cylinder on which the segments are clamped; and bristles passing through the segments from within same and having free extremities for yieldingly pressing the nuts against the knives and for effecting translation of the nuts through said concave.

4. In a nut huller, a concave having hull cutting knives extending thereinto; and a brush mounted to rotate in the concave and provided with exterior ribs disposed parallel to the axis of rotation of the head; and bristles fixed to the head from within same and provided with stretches threaded through the head and positioned relative to adjacent ones of the ribs to contact therewith and fulcrum thereon during flexure of the stretches when contacting the nuts with said knives.

5. In a nut huller; a concave comprising spaced apart end plates, each having an annular series of external ribs of substantially semi-cylindrical shape in transverse section; concavo-convex knives in the concaves of which are received respective ribs of the heads; the knives being spaced apart from each other for the discharge of broken parts of shells and hull cuttings from the concave; the ribs serving to enable the knives to be turned concentrically thereof to vary projection of the effective cutting edges of the knives into the concave; means for removably clamping the knives to the ribs; and rotary means in the concave provided with resilient elements for pressing the nuts against the knives to thereby effect a cutting away of the hulls from the shells during rotation of said rotary means and for translating the nuts from the intake side of the concave to the discharge side thereof.

6. A concave structure for nut hulling machines comprising a pair of spaced apart side plates; an annular series of transverse knives having their ends terminating at the respective heads and provided with effective hull cutting edges disposed for successive engagement with the nuts during conveyance of the latter through the concave; and means for clamping said knife ends to said heads; said heads having semi-cylindrical ribs and said knives being concavo-convex in transverse section and having their concave sides concentrically related to said ribs to enable the knives to turn on the ribs for variable adjustment of said cutting edges into said concave.

7. In a nut huller, a concave having a bottom comprising an annular series of transversely disposed and equidistantly spaced apart knives having hull cutting edges extending in the same direction and adapted for successive engagement with nuts during conveyance of same through the concave, a rotary brush mounted in the concave for advancing the hull surfaces of nuts against the cutting edges of the knives and for conveying the nuts through the concave, means supporting the brush for vertical adjustment relative to said knives, and means movable vertically with the brush during adjustment thereof for preventing return movement of the hulled nuts to the intake side of the concave after the nuts have been conveyed to the outlet side of said concave.

8. In a nut huller, a beater comprising a cylindrical segmental back, each segment of the back having circumferential rows of equidistantly spaced perforations which are obliquely disposed relative to the axis of the back, the perforations in one segment being in circumferential alinement with a corresponding row of perforations of the next adjacent section, whereby the back is provided with annular rows of perforations which are axially spaced apart from each other; and a bunch of flat steel bristles extending through each pair of perforations in each of the aforementioned rows from within the back, the bristles of each of said bunches being disposed flatwise against each other so that each bunch is provided with relatively diverging long stretches, the outer extremities of which are disposed parallel to the axis of the back.

GEORGE F. MAIERS.